United States Patent
Khafagy et al.

(10) Patent No.: US 10,718,307 B2
(45) Date of Patent: Jul. 21, 2020

(54) SYSTEM AND METHODS FOR OPERATING AN ENGINE

(71) Applicant: Ford Global Technologies, LLC, Dearborn, MI (US)

(72) Inventors: Hafiz Khafagy, Dearborn, MI (US); Ahmed Awadi, Farmington Hills, MI (US); Hussam Makkiya, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 180 days.

(21) Appl. No.: 15/943,480

(22) Filed: Apr. 2, 2018

(65) Prior Publication Data
US 2019/0301418 A1    Oct. 3, 2019

(51) Int. Cl.
*F02N 11/08* (2006.01)
*F02D 41/04* (2006.01)

(52) U.S. Cl.
CPC ........ *F02N 11/0822* (2013.01); *F02D 41/042* (2013.01); *F02D 2200/60* (2013.01); *F02N 11/0803* (2013.01); *F02N 2200/023* (2013.01); *F02N 2200/101* (2013.01); *F02N 2200/102* (2013.01); *F02N 2300/2002* (2013.01); *F02N 2300/2011* (2013.01)

(58) Field of Classification Search
CPC ........... F02D 41/06; F02D 41/062–065; F02N 11/0814–0822; F02N 11/0829–084
USPC .................... 123/179.3–179.4; 701/112, 113
See application file for complete search history.

(56) References Cited

U.S. PATENT DOCUMENTS

| | | | |
|---|---|---|---|
| 6,424,157 B1 | 7/2002 | Gollomp et al. | |
| 6,650,993 B2 | 11/2003 | Wolf et al. | |
| 6,732,043 B2 | 5/2004 | Schoch | |
| 9,670,868 B2* | 6/2017 | Hirano | F02D 17/04 |
| 2002/0183917 A1* | 12/2002 | Wolf | F02N 11/0822 |
| | | | 701/112 |
| 2013/0174539 A1* | 7/2013 | Ezawa | E02B 1/00 |
| | | | 60/431 |
| 2014/0081561 A1* | 3/2014 | Be | B60W 50/085 |
| | | | 701/112 |
| 2015/0210265 A1* | 7/2015 | Rademacher | B60W 10/06 |
| | | | 701/36 |
| 2015/0211468 A1* | 7/2015 | Ezumi | F02N 11/0825 |
| | | | 701/112 |
| 2016/0290270 A1* | 10/2016 | Sato | F02N 11/0825 |
| 2017/0016420 A1* | 1/2017 | Siekkinen | F02N 11/0818 |
| 2018/0334158 A1* | 11/2018 | Chen | F02N 11/00 |

* cited by examiner

*Primary Examiner* — Erick R Solis
*Assistant Examiner* — Robert A Werner
(74) *Attorney, Agent, or Firm* — Geoffrey Brumbaugh McCoy Russell LLP

(57) ABSTRACT

Systems and methods for operating a vehicle that includes an engine that may be automatically stopped and started are described. In one example, inhibiting of automatic engine stopping and starting may be withdrawn in response to a change in driver vehicle settings or when a temperature of an engine is less than a threshold temperature.

19 Claims, 9 Drawing Sheets ically stopped. The vehicle's human driver
SYSTEM AND METHODS FOR OPERATING AN ENGINE

FIELD

The present description relates to methods and a system for operating an engine that may be automatically stopped and started to conserve fuel. The methods and systems may be particularly useful to control inhibiting of automatic engine stopping and starting.

BACKGROUND AND SUMMARY

An engine of a vehicle may be automatically stopped and started to conserve fuel. The engine may be stopped via a controller in response to vehicle operating conditions without receiving a specific request to stop the engine from a human driver or occupant of the vehicle. The engine may also be stopped via a request that is generated by the human driver. Some human drivers prefer to operate the engine in a conventional mode whereby automatic engine stopping and starting is deactivated or inhibited so that the engine remains running (e.g., combusting fuel and rotating) during vehicle operating conditions where the engine would otherwise be automatmay deactivate or inhibit automatic engine stopping and starting via initiating a driver automatic engine stop/start inhibit request via a human/machine interface. The driver automatic engine stop/start inhibit request may in cleared so that the engine resumes automatic stopping and starting after the vehicle's human driver manually initiates an engine stop. However, the human driver may become agitated if he or she stops the engine and then returns to the vehicle a short time later to find that automatic engine stopping and starting has been reactivated. While automatically stopping and starting the engine may improve vehicle fuel economy, it may also result in driver dissatisfaction during some conditions where the driver prefers to keep the engine running.

The inventors herein have recognized the above-mentioned issues and have developed an engine operating method, comprising: inhibiting the automatic stopping and starting of the engine via a controller in response to a request made via a human/machine interface; and cancelling the request and allowing automatic stopping and starting of the engine via the controller in response to a human driver initiated engine stop and an engine temperature being less than a threshold temperature.

By canceling a request to inhibit automatic engine stopping and starting in response to a human driver initiated engine stop and an engine temperature being less than a threshold temperature, it may be possible to automatically reactivate automatic engine stopping and starting in a way that facilitates improved vehicle fuel economy without being objectionable to the vehicle's driver. In particular, reactivating automatic engine stopping and starting in response to engine temperature being less than the threshold temperature allows automatic engine stopping and starting to be reactivated after a longer period during which the engine was not operated. A vehicle's driver may be disturbed less when engine operation defaults back to automatic engine stopping and starting after an engine stop period during which the engine cooled down because engine operating conditions have changed since the engine was last operated and the driver is likely to understand the usefulness and necessity of improving vehicle fuel economy via automatic engine stopping and starting.

The present description may provide several advantages. In particular, the approaches may improve vehicle drivability for some drivers. Further, the approaches allow automatic engine stopping and starting to be inhibited or deactivated by a human driver, but the approach also automatically reactivates automatic engine stopping and starting so that the vehicle may achieve greater fuel economy. Further still, the approach may reactivate automatic engine stopping and starting in a way that may be more desirable to some drivers.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 2:
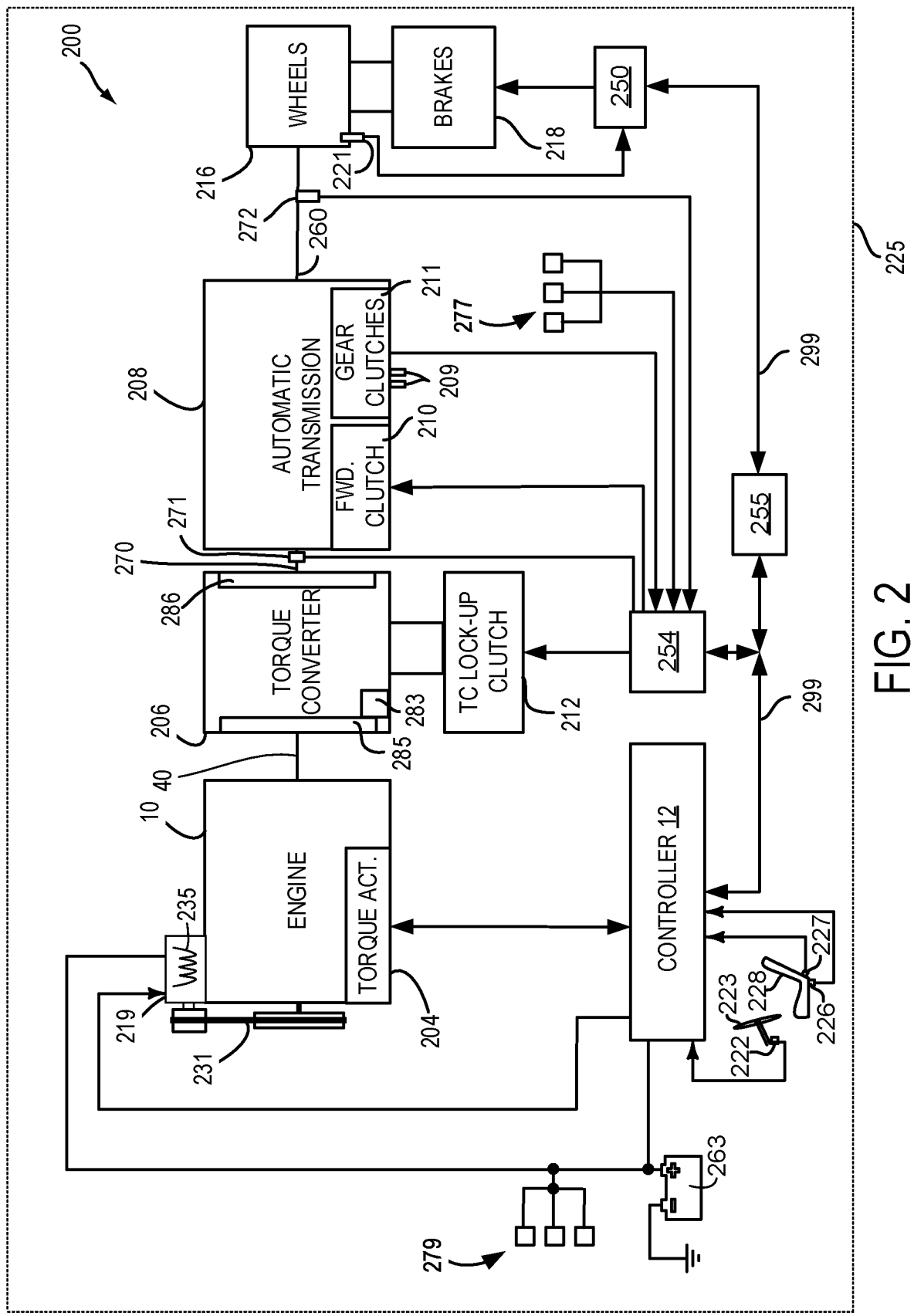
FIG. 2 is a schematic diagram of a vehicle driveline.
Figure 3:
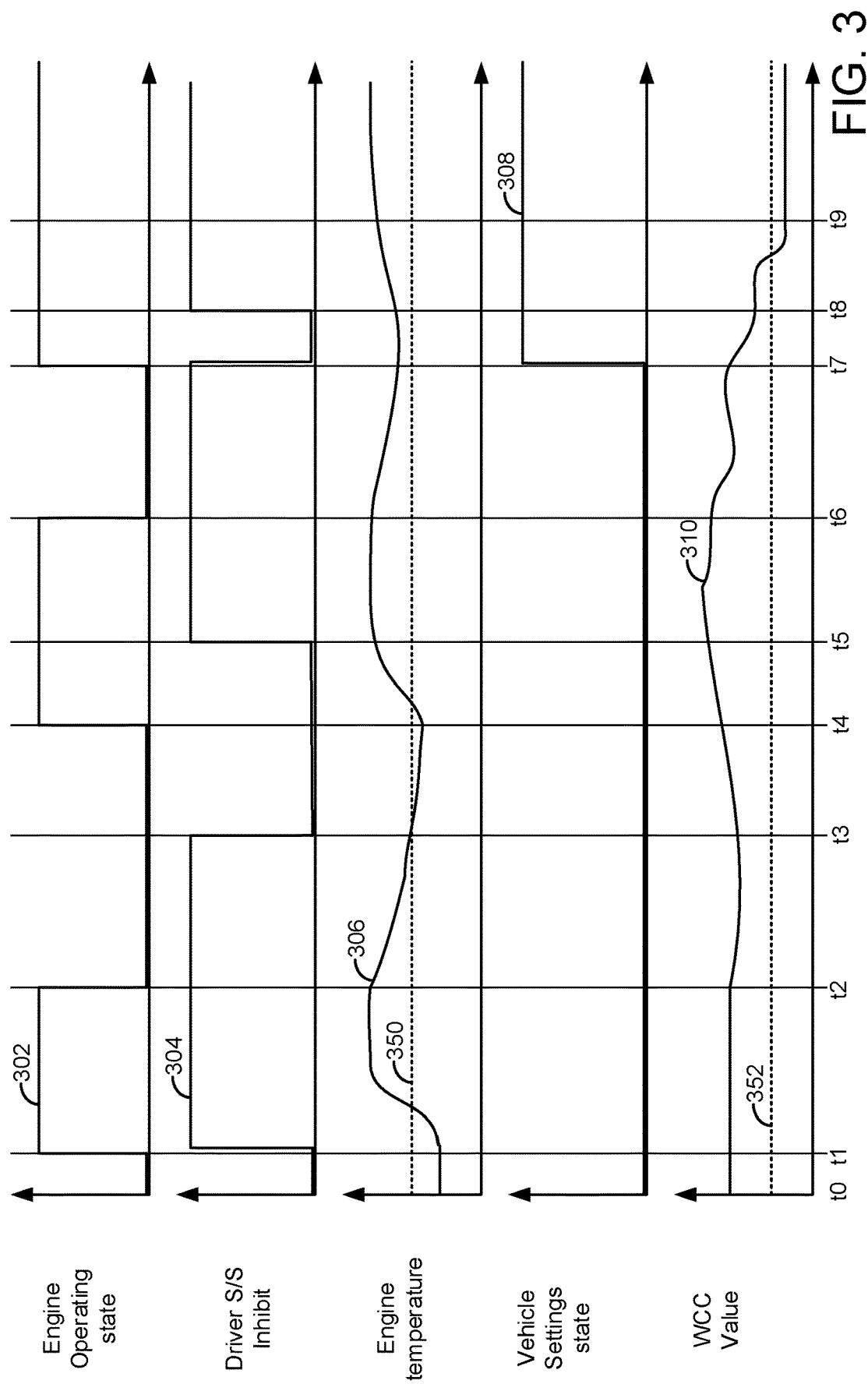
FIG. 3 shows an example engine operating sequence.
Figure 4:
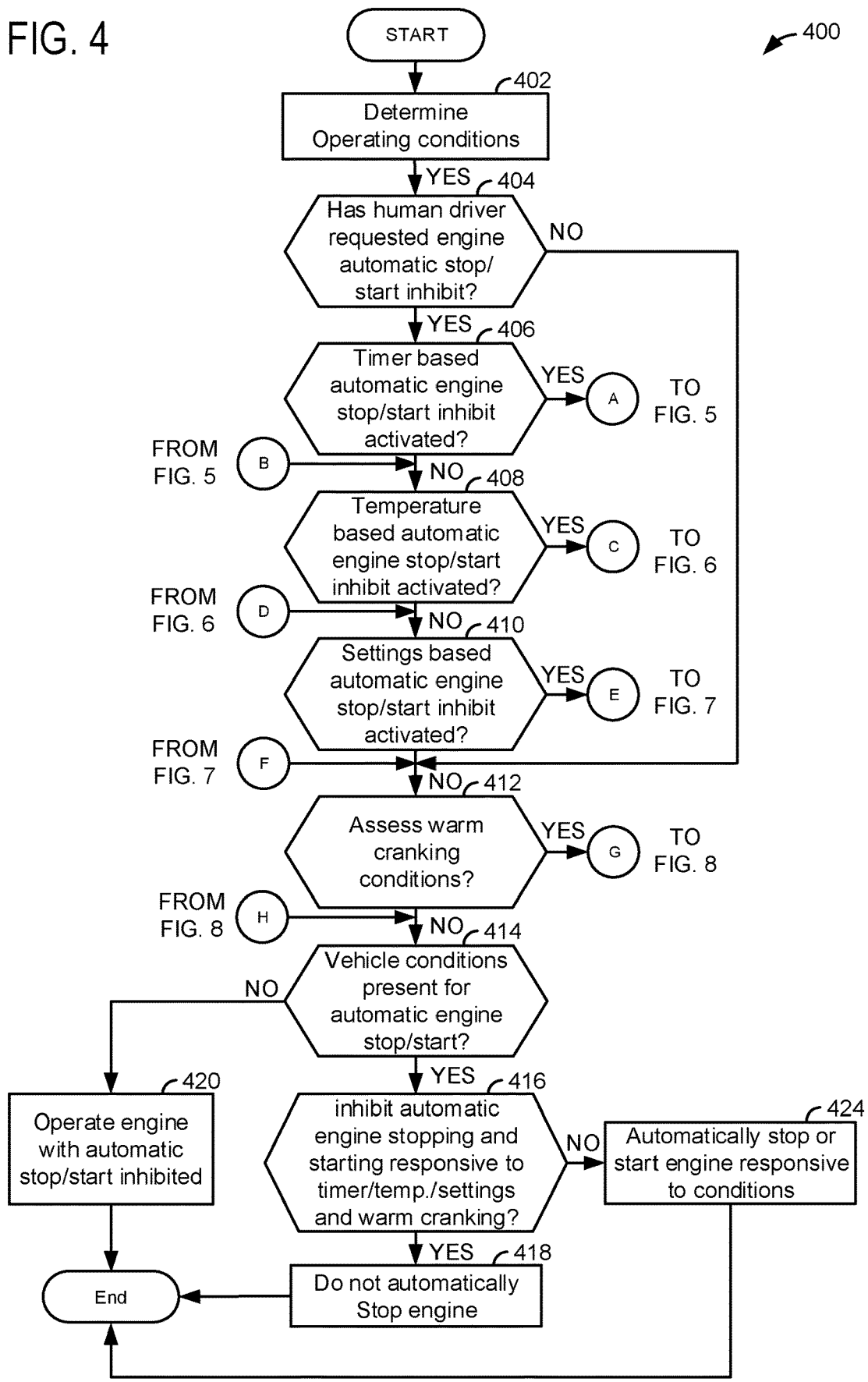
FIGS. 4-9 show a method for operating an engine and automatically reactivating automatic engine stopping and starting.
Figure 5:
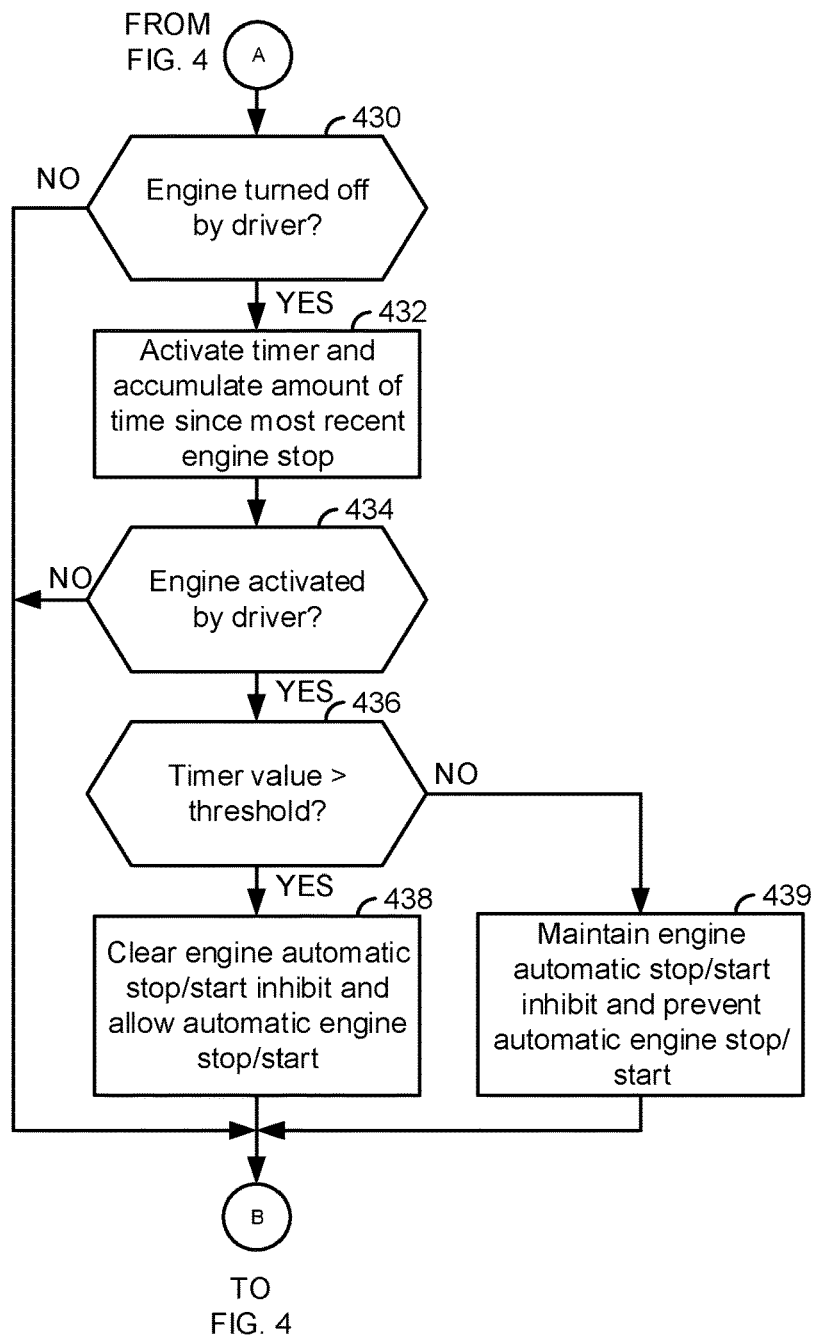
Figure 6:
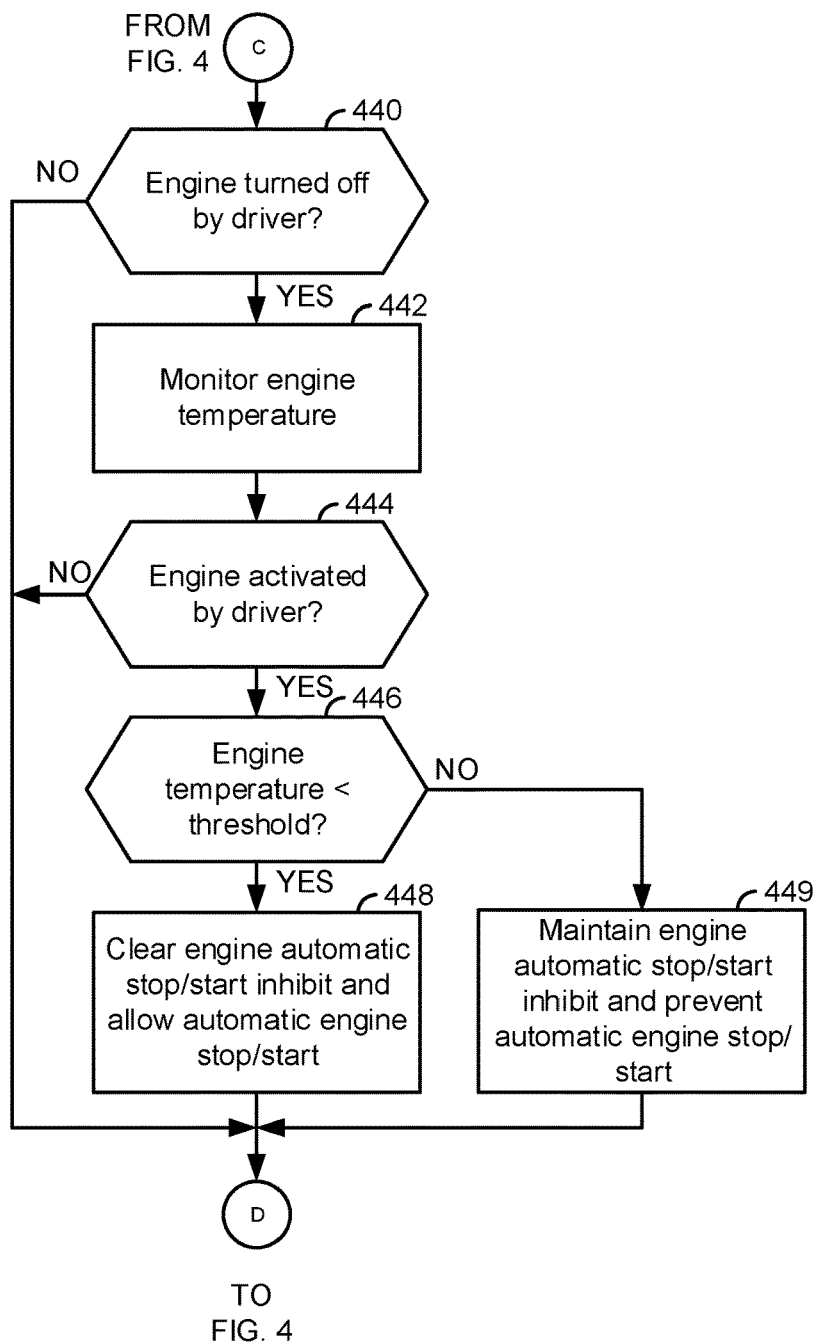
Figure 7:
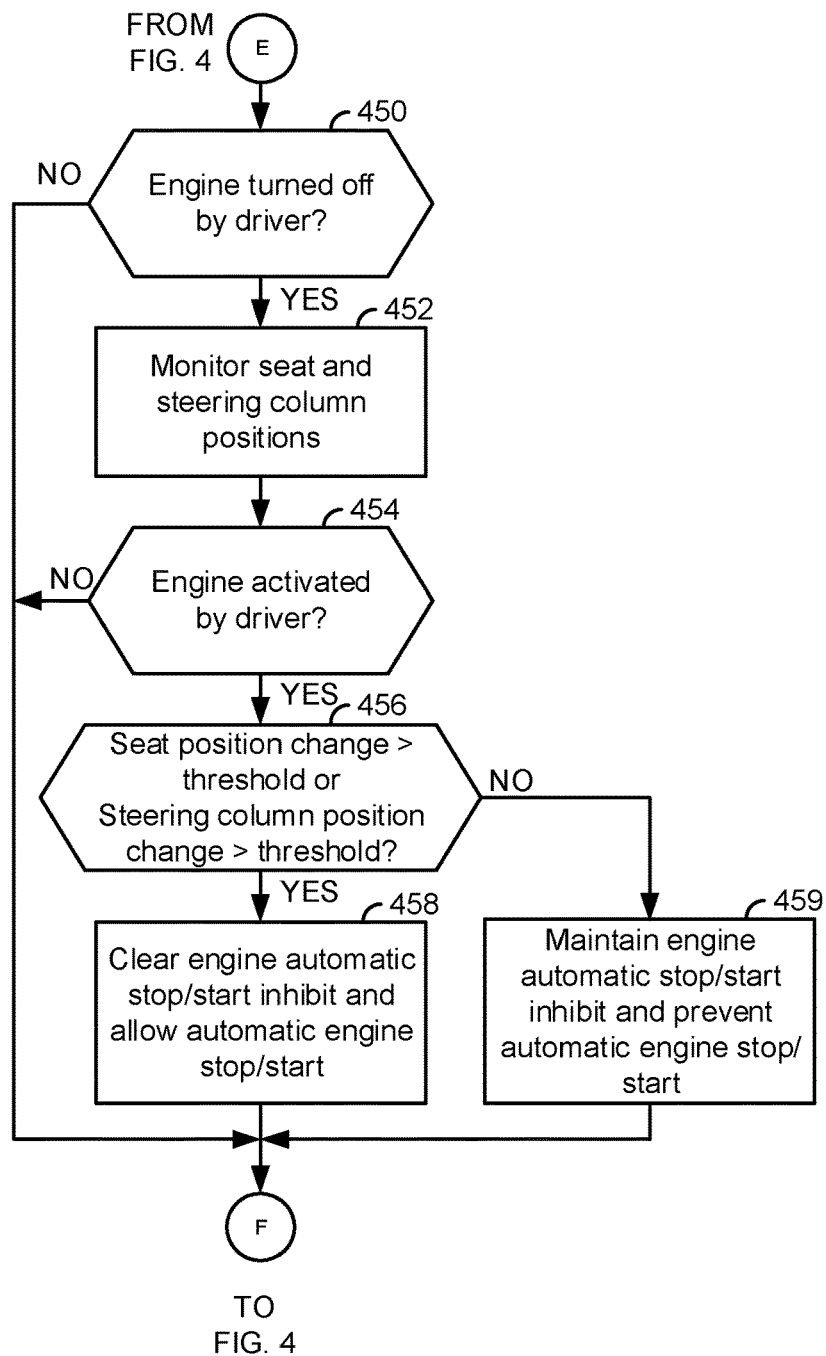
Figure 8:
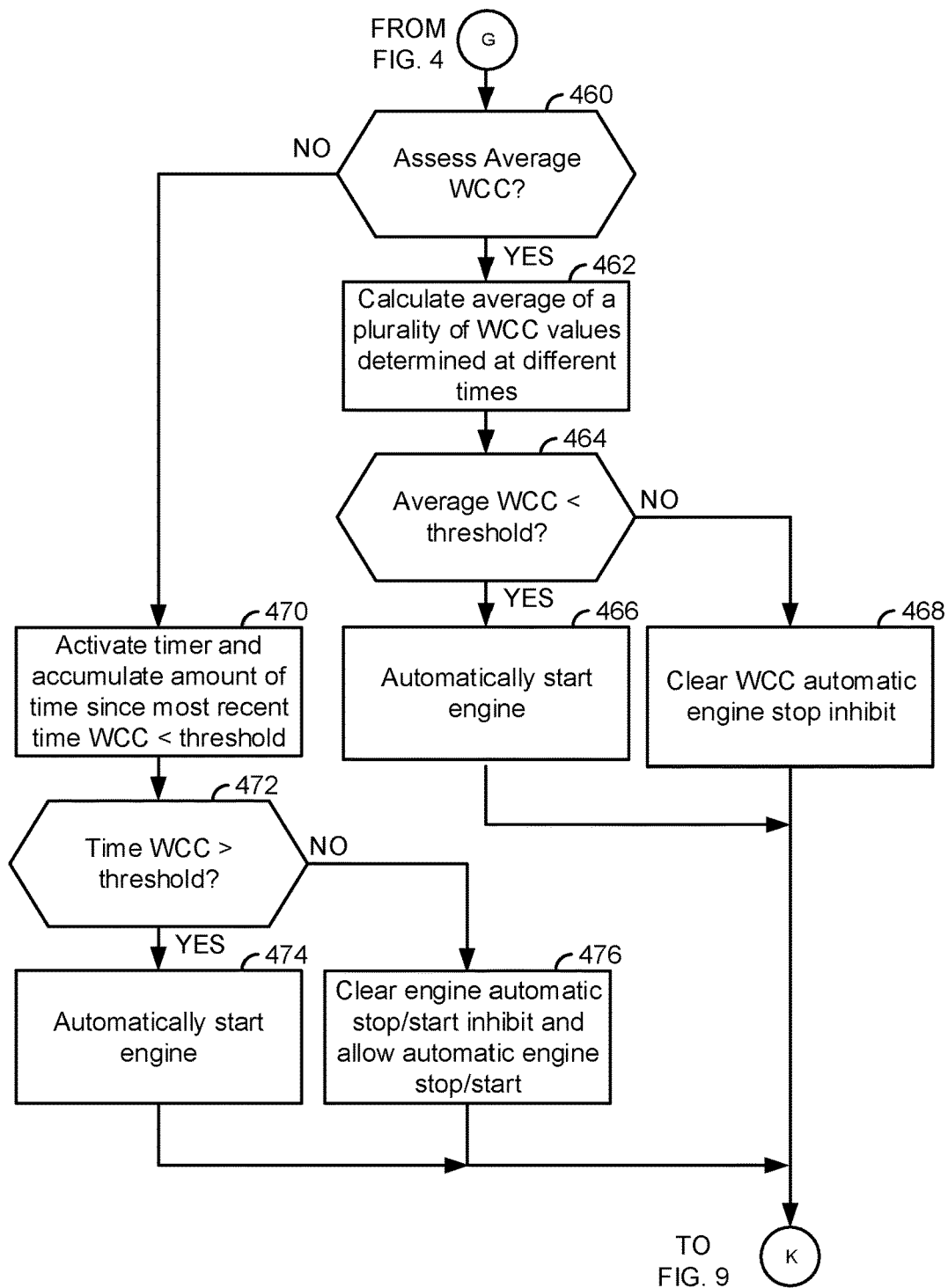
Figure 9:
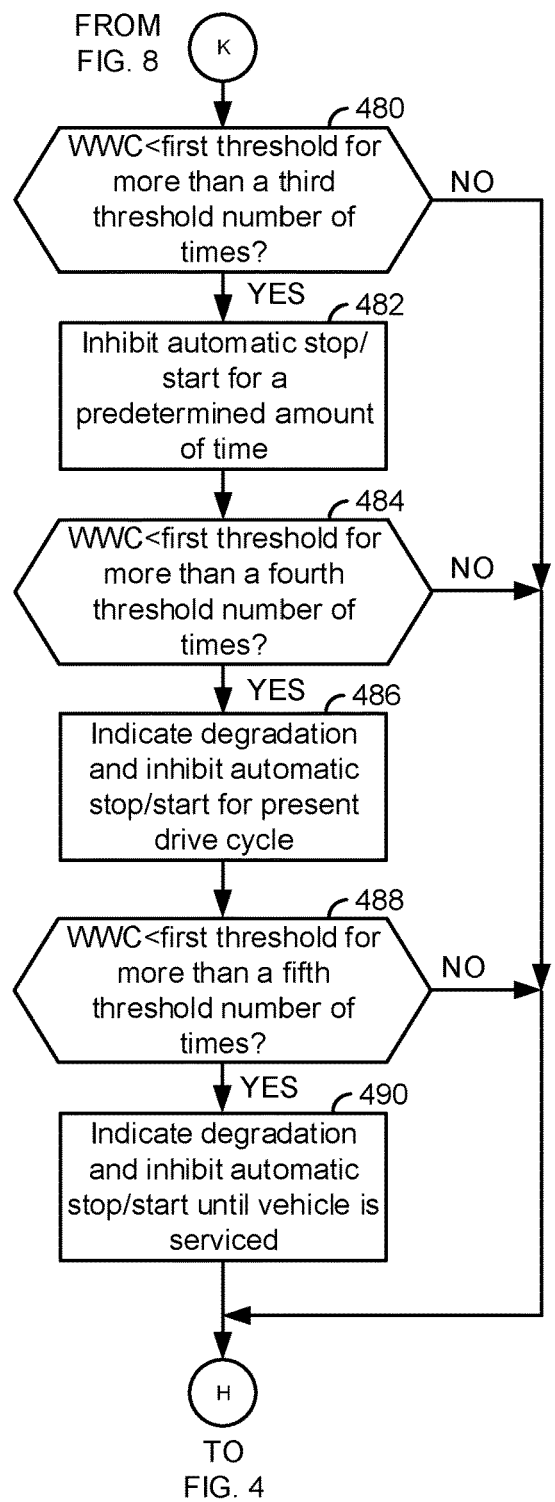

The present description is related to operating an engine and reactivating an automatic engine stopping and starting mode. Further, warm cranking conditions are assessed to determine if automatic engine starting is desired or if automatic engine stopping is to be prevented. The engine may be of the type shown in FIG. 1 or the engine may be a diesel engine. The engine may be included in a driveline of a vehicle as is shown in FIG. 2. The engine may be operated as is shown in the sequence of FIG. 3. The engine may be operated according to the method of FIGS. 4-9.

Figure 1:
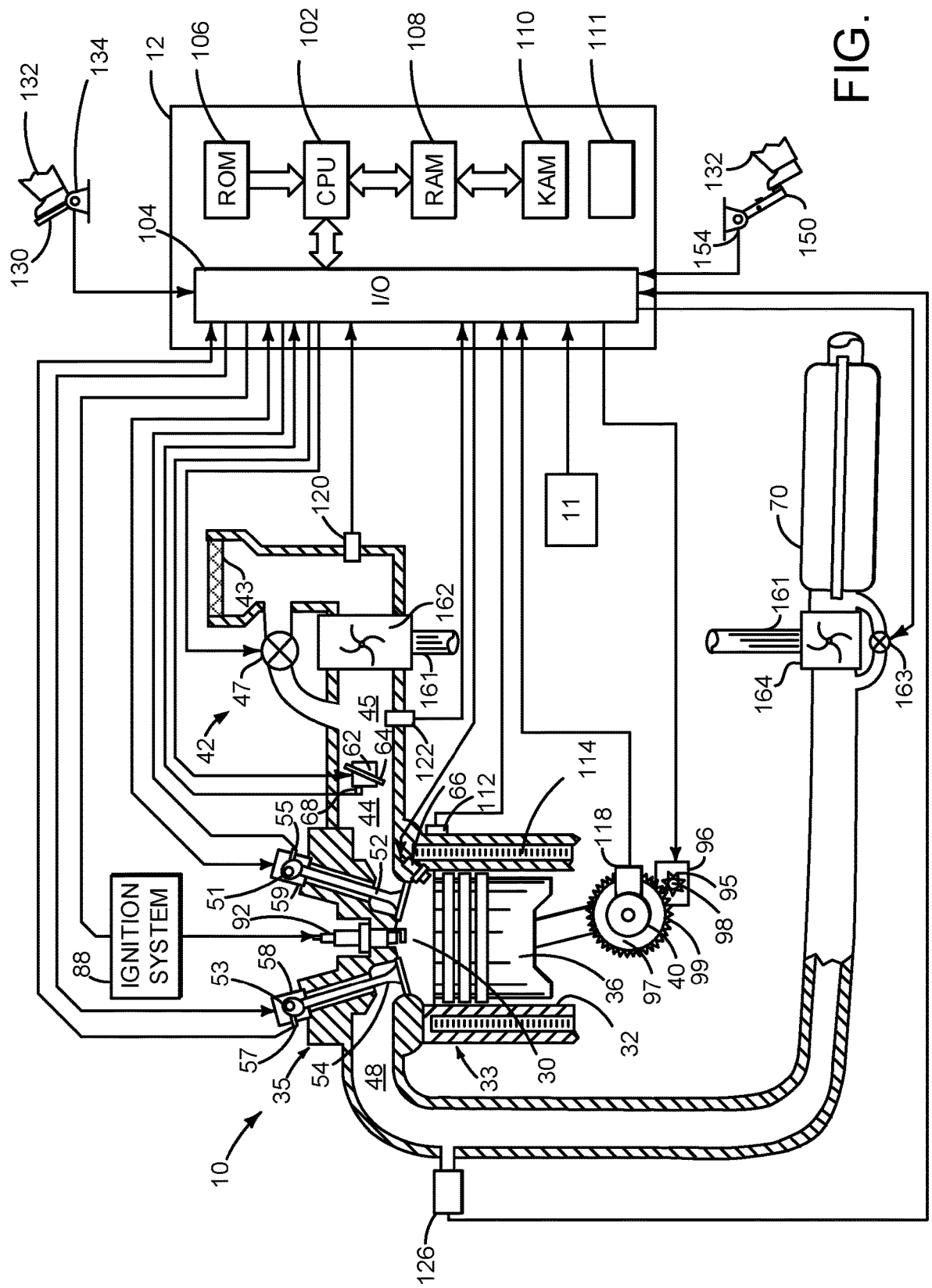
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Controller 12 receives signals from the various sensors shown in FIGS. 1 and 2. Further, controller 12 employs the actuators shown in FIGS. 1 and 2 to adjust engine operation based on the received signals and instructions stored in non-transitory memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 may also include one or more timers and/or counters 111 that keep track of an amount of time between a first event and a second event. The timer and/or counters may be constructed in hardware or software. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human driver 132; a position sensor 154 coupled to brake pedal 150 for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start the engine or vehicle may be generated via a human and input to the human/machine interface 11. The human/machine interface may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, transmission controller 254, and brake controller 250. The controllers may communicate over controller area network (CAN) 299. Each of the controllers may provide information to other controllers such as torque output limits (e.g., torque output of the device or component being controlled not to be exceeded), torque input limits (e.g., torque input of the device or component being controlled not to be exceeded), torque output of the device being controlled, sensor and actuator data, diagnostic information (e.g., information regarding a degraded transmission, information regarding a degraded engine, and information regarding degraded brakes). Further, the vehicle system controller 255 may provide commands to engine controller 12, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel torque or a wheel power level to provide a desired rate of vehicle deceleration. The desired wheel torque may be provided by vehicle system controller 255 requesting a braking torque from brake controller 250, thereby providing the desired braking torque at vehicle wheels 216.

In other examples, the partitioning of controlling powertrain devices may be partitioned differently than is shown in FIG. 2. For example, a single controller may take the place of vehicle system controller 255, engine controller 12, transmission controller 254, and brake controller 250. Alternatively, the vehicle system controller 255 and the engine controller 12 may be a single unit while the transmission controller 254 and the brake controller 250 are standalone controllers.

Engine 10 may be started with an engine starting system shown in FIG. 1. Further, torque of engine 10 may be adjusted via torque actuator 204, such as a fuel injector, throttle, etc. An engine output torque may be transmitted to torque converter 206 via crankshaft 40. Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The transmission controller 254 may be configured to adjust the amount of torque transmitted by torque converter 212 by adjusting the torque converter lock-up clutch in response to various engine operating conditions, or based on a driver-based engine operation request.

Torque converter 206 also includes pump 283 that pressurizes fluid to operate forward clutch 210 and gear clutches 211. Pump 283 is driven via impeller 285, which rotates at a same speed as crankshaft 40.

Automatic transmission 208 includes gear clutches (e.g., gears 1-10) 211 and forward clutch 210. Automatic transmission 208 is a fixed ratio transmission. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Torque output from the automatic transmission 208 may also be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to the driver pressing his foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the driver releasing his foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand torque or power request from an accelerator pedal or other device. Vehicle system controller 255 then allocates the requested driver demand torque to the engine. Vehicle system controller 255 requests the engine torque from engine controller. If the engine torque is less than a transmission input torque limit (e.g., a threshold value not to be exceeded), the torque is delivered to torque converter 206 which then relays at least a fraction of the requested torque to transmission input shaft 270. Transmission controller 254 selectively locks torque converter clutch 212 and engages gears via gear clutches 211 in response to shift schedules and TCC lockup schedules that may be based on input shaft torque and vehicle speed. In some conditions when it may be desired to charge electric energy storage device (e.g., battery) 263, controller 12 adjust current supplied to field winding 235 of alternator 219. Alternator 219 converts torque from engine 10 into electrical energy and it supplies the electrical energy to electric energy storage device 263. Electrical energy storage device 263 and alternator 219 may provide electrical power to electrical accessories 279, which may include but are not limited to front and rear windshield resistive heaters, vacuum pumps, climate control fans, and lights. Vehicle system controller 255 may request increased engine torque to overcome the charging torque to meet the driver demand torque.

In response to a request to decelerate vehicle 225, vehicle system controller 255 requests a friction braking torque by applying friction brakes 218. Accordingly, torque control of the various powertrain components may be supervised by vehicle system controller 255 with local torque control for the engine 10, transmission 208, and brakes 218 provided via engine controller 12, transmission controller 254, and brake controller 250.

As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), and ambient temperature sensors.

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel torque command from vehicle system controller 255. Brake controller 250 may also provide anti-lock and vehicle stability braking to improve vehicle braking and stability. As such, brake controller 250 may provide a wheel torque limit (e.g., a threshold negative wheel torque not to be exceeded) to the vehicle system controller 255 so that wheels do not lock for an extended period of time.

Controller 12, or alternatively controller 255 may receive position information from steering wheel sensor 222, which provides a position of steering wheel 223. Seat sensors 226 and 227 provide position information of seat 228. The positions indicated by sensors 222, 226, and 227 may be referred to as vehicle driver settings since a driver may adjust positions of seat 228 and steering wheel to suit the driver's comfort. The positions for a particular driver may be stored in controller volatile memory and the positions may be associated with a particular key fob or human/machine interface setting. If the positions of the seat or the steering wheel change from positions stored in memory and that correspond to a particular human driver, then controller 12 or control 255 may determine that a change in state of the vehicle driver settings has been made for a new driver.

The system of FIGS. 1 and 2 is only one example system where the methods described herein may be applied. For example, the methods described herein may apply to parallel and series hybrid and partial hybrid vehicles. Further, the methods described herein may be applied to personal or commercial vehicles including cars and trucks.

Thus, the system of FIGS. 1 and 2 provide for a system, comprising: an engine; a starter coupled to the engine; and a controller including executable instructions stored in non-transitory memory to inhibit automatic stopping and starting of the engine via the starter or an electric machine in response to an average of a plurality of warm cranking condition values being less than a threshold value. The system further comprises additional instructions to allow automatic engine stopping and starting in response to the average of the plurality of warm cranking condition values being greater than the threshold value. The system further comprises additional instructions to allow automatic stopping and starting of the engine after a human driver has deactivated automatic engine stopping and starting in response to a human driver initiated engine stop and a change in state of vehicle driver settings. The system includes where the change in state of vehicle driver settings includes a change of a seat position. The system further comprises additional instructions to allow automatic stopping and starting of the engine after automatic engine stopping and starting has been deactivated by a human driver in response to a human driver initiated engine stop and engine temperature being less than a threshold temperature.

Referring now to FIG. 3, example plots of a vehicle operating sequence are shown. The operating sequence may be performed via the system of FIGS. 1 and 2 in cooperation with the method of FIGS. 4-9. Vertical lines at times t0-t9 represent times of interest during the sequence. The plots in FIG. 3 are time aligned and occur at the same time.

The first plot from the top of FIG. 3 is a plot of engine operating state versus time. The vertical axis represents engine operating state and the engine is operating (e.g., combusting fuel and rotating) when trace 302 is at a higher level near the vertical axis arrow. The engine is not operating (e.g., not combusting fuel and rotation is stopped) when trace 302 is at a lower level near the horizontal axis. The horizontal axis represents time and time increases from the left side of the figure to the right side of the figure. Solid line 302 represents engine operating state.

The second plot from the top of FIG. 3 is a plot of human driver initiated or requested inhibiting of automatic engine stopping and starting versus time. The vertical axis represents human driver initiated or requested inhibiting of automatic engine stopping and starting and human driver initiated or requested inhibiting of automatic engine stopping and starting is active when trace 304 is at a higher level near the vertical axis arrow. The human driver initiated or requested inhibiting of automatic engine stopping and starting is not asserted when trace 304 is at the level near the horizontal axis. Solid line trace 304 represents human driver initiated or requested inhibiting of automatic engine stopping and starting state. The horizontal axis represents time and time increases from the left side of the figure to the right side of the figure. The third plot from the top of FIG. 3 is a plot of an engine temperature versus time. The vertical axis represents engine temperature and the engine temperature increases in the direction of the vertical axis arrow. The horizontal axis represents time and time increases from the left side of the figure to the right side of the figure. Trace 306 represents the engine temperature (e.g., engine coolant temperature). Horizontal line 350 represents a threshold engine temperature. If a human driver has requested inhibiting of automatic engine stopping and starting, the requested inhibiting of automatic engine stopping and starting will not be cleared in response to engine temperature if engine temperature is greater than the temperature of threshold 350. The requested inhibiting of automatic engine stopping and starting may be cleared in response to engine temperature if engine temperature is less than the temperature of threshold 350.

The fourth plot from the top of FIG. 3 is a plot of vehicle settings state versus time. The vertical axis represents vehicle setting state and the vehicle setting state changes from a higher level to a lower level or from a lower level to a higher level when one or more driver dependent comfort settings or positions of a seat or steering wheel are changed. Solid line trace 308 represents vehicle settings state. The horizontal axis represents time and time increases from the left side of the figure to the right side of the figure.

The fifth plot from the top of FIG. 3 is a plot of warm cranking conditions (WCC) value versus time. The vertical axis represents values of warm cranking conditions and the value of warm cranking conditions increases in the direction of the vertical axis arrow. Higher values of warm cranking conditions indicate less degradation of the engine cranking system (e.g., battery, charge carrying cables, electrical connections, and starter) and lower warm cranking condition values indicate increased degradation of the engine cranking system. Solid line trace 310 represents warm cranking condition values. The horizontal axis represents time and time increases from the left side of the figure to the right side of the figure. Horizontal line 352 represents a threshold warm cranking condition parameter value. If a warm cranking condition parameter value is greater than threshold 352, automatic engine starting and stopping based on warm cranking conditions is allowed. If a warm cranking condition parameter value is less than threshold 352, automatic engine starting and stopping based on warm cranking conditions is not permitted and the engine may be automatically started.

At time t0, the engine is stopped (e.g., not rotating and not combusting fuel) and the vehicle's human driver has not requested inhibiting of automatic engine stopping and starting. The engine temperature is low and the vehicle settings state is a low value. The warm cranking condition value is greater than threshold 352.

At time t1, the engine is started and the vehicle settings remain at their previous level. The driver request to inhibit automatic engine stopping and starting is not asserted at time t1, but it is asserted shortly thereafter. Consequently, the engine is not automatically stopped and started during the present drive cycle (e.g., a vehicle drive cycle begins when a human driver activates the vehicle (provides power to the vehicle powertrain (engine or electric machine)) and the drive cycle ends after the human driver deactivates the vehicle, the human driver deactivating the vehicle after the human driver most recently activated the vehicle). The engine temperature is low, but it begins to increase. The warm cranking condition value remains at its previous value.

Between time t1 and time t2, the engine continues to run (e.g., combust fuel and rotate) and the driver requested inhibiting of automatic engine stopping and starting remains asserted. The engine temperature increases to a level above threshold 350 and the vehicle settings are unchanged. The warm cranking condition parameter remains unchanged.

At time t2, the engine operating state changes from running to stopped (e.g., not supplied with fuel and not rotating) in response to the human driver requesting that the engine be stopped. The driver request to inhibit automatic engine stopping and starting remains asserted and engine temperature is greater than threshold 350. The vehicle settings state is unchanged and the warm cranking condition value is unchanged.

At time t3, the engine temperature falls to a level below threshold 350. The driver request to inhibit automatic engine stopping and starting state is changed from a high level to a low level. Thus, the driver request to inhibit automatic engine stopping and starting is cleared and not asserted in response to engine temperature below threshold 350 and the engine being stopped by the human driver. The vehicle settings state remains unchanged and the warm engine cranking value is reduced a small amount, but it remains above threshold 352. The engine remains off.

At time t4, the engine is operating state changes from off to on and the engine begins running in response to the human driver activating the engine (not shown). The driver request to inhibit automatic engine stopping and starting is not asserted and engine temperature is below threshold 350. The vehicle settings have not changed and the warm cranking condition value has increased by a small amount.

Between time t4 and time t5, the engine temperature has increased to a level that is above threshold 350. The engine continues to operate and the driver request to inhibit automatic engine stopping and starting is not asserted. The vehicle settings state has not changed and the warm craning condition value remains above threshold 352.

At time t5, the human driver asserts the driver request to inhibit automatic engine stopping and starting. The engine continues running and engine temperature is greater than threshold 350. The vehicle settings remain unchanged and the warm cranking condition value remains above threshold 352. The human driver stops the engine at time t6 and the other variables continue at their previous values.

At time t7, the human driver starts the engine and the engine begins to run. The driver request to inhibit automatic engine stopping and starting is asserted. The engine temperature is greater than threshold 350 and the vehicle settings have not changed. The value of the warm cranking conditions has not changed, but the warm cranking condition value is decreasing. Shortly after time t7, the human driver changes a position of a seat in the vehicle and the vehicle settings state changes in response to the change in position of the seat. The change in the state of the vehicle settings provides an indication to the control system that a different driver may have entered the vehicle and the new driver may not expect the automatic engine stopping and starting to be inhibited. The driver request to inhibit automatic engine stopping and starting is cleared in response to the change in vehicle setting state so that automatic engine stopping and starting is permitted.

At time t8, the driver request to inhibit automatic engine stopping and starting is reasserted by the new driver so that automatic engine stopping and starting is inhibited. The engine temperature remains above threshold 350, but the warm cranking condition value continues to decrease. The vehicle settings remain unchanged.

At time t9, the value of the warm cranking condition parameter has decreased to less than the level of threshold 352 for more than a predetermined amount of time so that automatic engine stopping and starting is inhibited. The driver request to inhibit automatic engine stopping and starting remains asserted and the engine continues to operate. The engine temperature remains above threshold 350 and the vehicle settings state has not changed.

In this way, automatic engine stopping and starting may be inhibited by a human driver command. The human driver command to inhibit automatic engine stopping and starting may be overridden and cleared in response to a change in vehicle settings or engine temperature being less than a threshold temperature. These conditions may provide an indication that the vehicle's present human driver may not object to cancelling the human driver initiated driver request to inhibit automatic engine stopping and starting. Further, automatic engine stopping and starting may be prevented if a value of a warm cranking condition is less than a threshold value.

Referring now to FIGS. 4-9, a flow chart of a method for operating an engine that includes automatic stopping and starting capability is shown. The method of FIGS. 4-9 may be incorporated into and may cooperate with the system of FIGS. 1 and 2. Further, at least portions of the method of FIGS. 4-9 may be incorporated as executable instructions stored in non-transitory memory while other portions of the method may be performed via a controller transforming operating states of devices and actuators in the physical world.

At 402, method 400 determines operation conditions. Operating conditions may include but are not limited to engine speed, battery SOC, battery health value, battery current, battery resistance, battery voltage, engine load, driver demand torque, and engine operating state. The operating conditions may be determined via inputs to the controller. Method 400 proceeds to 404.

At 404, method 400 judges if a human driver of the vehicle has request inhibiting of automatic engine stopping and starting. A human driver may request inhibiting of automatic engine stopping and starting if the vehicle is performing tasks where the vehicle's battery may be drained quickly if the engine is automatically stopped or for other reasons. The human driver may request inhibiting of automatic engine stopping and starting via a human/machine interface and a value of a variable stored in memory indicates the presence or absence of the human driver may request inhibiting of automatic engine stopping and starting. If method 400 judges that the human driver is requesting inhibiting of automatic engine stopping and starting, then the answer is yes and method 400 proceeds to 406. Otherwise, the answer is no and method 400 proceeds to 412.

At 406, method 400 judges if timer based deactivation or clearing of the human driver requested inhibiting of automatic engine stopping and starting is activated. If timer based deactivation or clearing of the human driver requested inhibiting of automatic engine stopping and starting is activated, a human driver requested inhibiting of automatic engine stopping and starting may be cleared or deactivated in response to a value stored in a timer. If timer based deactivation or clearing of the human driver requested inhibiting of automatic engine stopping and starting is activated, then the answer is yes and method 400 proceeds to 430 of FIG. 5. Otherwise, the answer is no and method 400 proceeds to 408. A human may activate timer based deactivation or clearing of the human driver requested inhibiting of automatic engine stopping and starting via a human/machine interface. Alternatively, timer based deactivation or clearing of the human driver requested inhibiting of automatic engine stopping and starting may be performed automatically via a controller.

At 408, method 400 judges if engine temperature based deactivation or clearing of the human driver requested inhibiting of automatic engine stopping and starting is activated. If engine temperature based deactivation or clearing of the human driver requested inhibiting of automatic engine stopping and starting is activated, a human driver requested inhibiting of automatic engine stopping and starting may be cleared or deactivated in response to a temperature of the engine. If engine temperature based deactivation or clearing of the human driver requested inhibiting of automatic engine stopping and starting is activated, then the answer is yes and method 400 proceeds to 440 of FIG. 6. Otherwise, the answer is no and method 400 proceeds to 410. A human may activate engine temperature based deactivation or clearing of the human driver requested inhibiting of automatic engine stopping and starting via a human/machine interface. Alternatively, engine temperature based deactivation or clearing of the human driver requested inhibiting of automatic engine stopping and starting may be performed automatically via a controller.

At 410, method 400 judges if vehicle settings based deactivation or clearing of the human driver requested inhibiting of automatic engine stopping and starting is activated. If vehicle settings based deactivation or clearing of the human driver requested inhibiting of automatic engine stopping and starting is activated, a human driver requested inhibiting of automatic engine stopping and starting may be cleared or deactivated in response to a vehicle settings state value. If vehicle settings based deactivation or clearing of the human driver requested inhibiting of automatic engine stopping and starting is activated, then the answer is yes and method 400 proceeds to 450 of FIG. 7. Otherwise, the answer is no and method 400 proceeds to 412. A human may activate vehicle settings based deactivation or clearing of the human driver requested inhibiting of automatic engine stopping and starting via a human/machine interface. Alternatively, vehicle settings based deactivation or clearing of the human driver requested inhibiting of automatic engine stopping and starting may be performed automatically via a controller.

At 412, method 400 judges if warm cranking conditions of an engine should be assessed. In one example, warm engine cranking conditions may be assessed from a time a human driver requests vehicle operation until the human driver requests deactivation of the vehicle. In other examples, warm cranking conditions may be assessed only after the engine reaches a threshold temperature. If warm cranking conditions are to be assessed, then the answer is yes and method 400 proceeds to 460 of FIG. 8. Otherwise, the answer is no and method 400 proceeds to 414.

At 414, method 400 judges if conditions are present for automatic engine stopping and starting. Automatic engine stopping and starting may be performed without a human driver specifically requesting an engine stop or start via a dedicated input device (e.g., an ignition switch or pushbutton). The engine may be automatically stopped via a controller in response to driver demand torque being less than a threshold torque. Further, other conditions such as battery state of charge (SOC) being greater than a threshold may also be required to initiate automatic engine stopping and starting. The engine may be automatically stopped by ceasing to flow fuel to the engine via stopping fuel flow through fuel injectors in response to driver demand torque being less than a threshold torque. If method 400 judges that conditions to permit automatic engine stopping are present, the answer is yes and method 400 proceeds to 416. Otherwise, the answer is no and method 400 proceeds to 420.

At 420, method 400 operates the engine and it does not permit automatic engine stopping. The engine continues to run (e.g., rotate and combust fuel) when automatic engine stopping is not permitted. Further, the engine may be automatically started if the engine is already stopped when conditions are not present to automatically stop the engine. For example, if the driver is increasing driver demand torque via applying the accelerator pedal, then the engine may be automatically started if the engine is stopped. Driver demand torque may be determined based on accelerator pedal position and vehicle speed. In one example, a table or function is referenced via accelerator pedal position and vehicle speed. The table or function outputs a value of driver demand torque that has been empirically determined via operating the vehicle on a road and accessing vehicle acceleration relative to accelerator pedal position and vehicle speed. Once the engine is started and automatic engine stopping and starting is deactivated, the engine will continue to run until the human driver requests that the engine stop. Method 400 proceeds to exit.

At 416, method 400 judges if inhibiting of automatic engine stopping and starting is desired responsive to human driver input, timer based automatic engine stop and start, engine temperature based automatic engine stop and start, vehicle settings based automatic engine stop and start, and warm cranking conditions based automatic engine stop and start. For example, if a human driver requests inhibiting of automatic engine stopping and automatic engine stopping and starting inhibiting is not cleared by timer based automatic engine stop and start (steps 430-439), engine temperature based automatic engine stop and start (steps 440-449), vehicle settings based automatic engine stop and start (steps 450-459), and warm cranking conditions based automatic engine stop and start (steps 460-490), then the answer is yes and method 400 proceeds to 418. However, if a human driver requests inhibiting of automatic engine stopping and automatic engine stopping and starting inhibiting is cleared by timer based automatic engine stop and start (steps 430-439), engine temperature based automatic engine stop and start (steps 440-449), vehicle settings based automatic engine stop and start (steps 450-459), or warm cranking conditions based automatic engine stop and start (steps 460-490), then the answer is no and method 400 proceeds to 424.

At 418, method 400 does not permit or prevents the engine from being automatically stopped and started. In other words, the engine continues to run during conditions when the engine would otherwise be automatically stopped. Method 400 proceeds to exit.

At 424, method 400 permits or allows the engine to be automatically stopped and started. In other words, the engine is automatically stopped during conditions when automatic engine stopping is allowed (e.g., when driver demand torque is less than a threshold torque). Method 400 proceeds to exit.

At 430, method 400 judges if the engine has been stopped via the human driver since the time the human driver most recently requested inhibiting or preventing of automatic engine stopping and starting. The human driver may stop the engine via a key switch, pushbutton, or proximity device (key fob) that takes requests from the driver to stop or start the engine or that has the sole function of starting and stopping the engine. In other words, the engine is not automatically stopped. In one example, method 400 tracks human initiated engine stops in memory and judges if the engine has been stopped via a human driver requesting an engine stop based on a value of a variable stored in controller volatile memory. If method 400 judges that the engine has been stopped by the human driver or in response to a request from the human driver, the answer is yes and method 400 proceeds to 432. Otherwise, the answer is no and method 400 proceeds to 408.

At 432, method 400 activates a timer in controller memory and it begins tracking an amount of time since the engine was most recently stopped by the human driver (not automatically stopped). Method 400 proceeds to 434.

At 434, method 400 judges if the engine has been restarted or activated via a human requesting an engine start via an ignition key switch, pushbutton, or proximity device. If so, the answer is yes and method 400 proceeds to 436. Otherwise, the answer is no and method 400 proceeds to 408.

At 436, method 400 judges if a value stored in the timer that is described at 432 is greater than a threshold value. If so, the answer is yes and method 400 proceeds to 438. Otherwise, the answer is no and method 400 proceeds to 439.

At 438, method 400 clears the human driver's request to inhibit automatic engine stopping and starting so that the engine may be allowed to automatically stop and start again. Thus, the driver's request to inhibit automatic engine stopping and starting may be cleared after the engine has been stopped via a human driver and after a threshold amount of time has lapsed since the engine was stopped by the human driver. This allows the engine to automatically stop and start to conserve fuel, but it also allows engine automatic stopping and starting to be inhibited for one or more drive cycles so that the driver may not be agitated by the engine automatically stopping and starting. Method 400 proceeds to 408.

At 439, method 400 maintains the human driver's request to inhibit automatic engine stopping and starting so that the engine may not be allowed to automatically stop and start. Thus, the driver's request to inhibit automatic engine stopping and starting may be maintained after the engine has been stopped via a human driver and after less than a threshold amount of time has lapsed since the engine was stopped by the human driver. This allows the driver's intentions to be honored when time between engine stops may be short so that the driver is not agitated by the engine automatically stopping and starting. Method 400 proceeds to 408.

At 440, method 400 judges if the engine has been stopped via the human driver since the time the human driver most recently requested inhibiting or preventing of automatic engine stopping and starting. The human driver may stop the engine via a key switch, pushbutton, or proximity device (key fob) that takes requests from the driver to stop or start the engine or that has the sole function of starting and stopping the engine. In other words, the engine is not automatically stopped. If method 400 judges that the engine has been stopped by the human driver or in response to a request from the human driver, the answer is yes and method 400 proceeds to 442. Otherwise, the answer is no and method 400 proceeds to 410.

At 442, method 400 monitors engine temperature and save a value of engine temperature in controller memory. Method 400 proceeds to 444.

At 444, method 400 judges if the engine has been restarted or activated via a human requesting an engine start via an ignition key switch, pushbutton, or proximity device. If so, the answer is yes and method 400 proceeds to 446. Otherwise, the answer is no and method 400 proceeds to 410. In some examples, step 444 may be omitted.

At 446, method 400 judges if the engine temperature value that is described at 442 is less than a threshold value. If so, the answer is yes and method 400 proceeds to 448. Otherwise, the answer is no and method 400 proceeds to 449.

At 448, method 400 clears the human driver's request to inhibit automatic engine stopping and starting so that the engine may be allowed to automatically stop and start again. Thus, the driver's request to inhibit automatic engine stopping and starting may be cleared after the engine has been stopped via a human driver and after engine temperature is less than a threshold temperature. This allows the engine to automatically stop and start to conserve fuel, but it also allows engine automatic stopping and starting to be inhibited for one or more drive cycles so that the driver may not be agitated by the engine automatically stopping and starting Method 400 proceeds to 410.

At 449, method 400 maintains the human driver's request to inhibit automatic engine stopping and starting so that the engine may not be allowed to automatically stop and start. Thus, the driver's request to inhibit automatic engine stopping and starting may be maintained after the engine has been stopped via a human driver and when engine temperature is less than a threshold temperature. This allows the driver's intentions to be honored when the engine has not cooled much between engine stops so that the driver is not agitated by the engine automatically stopping and starting. Method 400 proceeds to 410.

At 450, method 400 judges if the engine has been stopped via the human driver since the time the human driver most recently requested inhibiting or preventing of automatic engine stopping and starting. The human driver may stop the engine via a key switch, pushbutton, or proximity device (key fob) that takes requests from the driver to stop or start the engine or that has the sole function of starting and stopping the engine. In other words, the engine is not automatically stopped. If method 400 judges that the engine has been stopped by the human driver or in response to a request from the human driver, the answer is yes and method 400 proceeds to 452. Otherwise, the answer is no and method 400 proceeds to 412.

At 452, method 400 monitors vehicle seat position and steering wheel positions to determine if a change in seat or steering wheel position occurs. Further, vehicle mirror positions may be monitored to determine if a change in mirror position occurs. Monitoring these positions or settings may be referred to as monitoring vehicle settings. Method 400 proceeds to 454.

At 454, method 400 judges if the engine has been restarted or activated via a human requesting an engine start via an ignition key switch, pushbutton, or proximity device. If so, the answer is yes and method 400 proceeds to 456. Otherwise, the answer is no and method 400 proceeds to 412.

At 456, method 400 judges if the vehicle seat position change (if present) is greater than a threshold amount or if a steering wheel position change (if present) is greater than a threshold amount. If so, the answer is yes and method 400 proceeds to 458. Otherwise, the answer is no and method 400 proceeds to 459.

At 458, method 400 clears the human driver's request to inhibit automatic engine stopping and starting so that the engine may be allowed to automatically stop and start again. Thus, the driver's request to inhibit automatic engine stopping and starting may be cleared or not asserted after the engine has been stopped via a human driver and after a change in seat position or a change in steering wheel position is detected. This allows the engine to automatically stop and start to conserve fuel, but it also allows engine automatic stopping and starting to be inhibited for as long as vehicle settings do not indicate a new driver is driving the vehicle. Method 400 proceeds to 412.

At 459, method 400 maintains the human driver's request to inhibit automatic engine stopping and starting so that the engine may not be allowed to automatically stop and start. Thus, the driver's request to inhibit automatic engine stopping and starting may be maintained after the engine has been stopped via a human driver and when seat position and steering wheel position do not change to indicate a new human driver. This allows the driver's intentions to be honored when the vehicle settings indicate only a single driver is driving the vehicle so that the driver is not agitated by the engine automatically stopping and starting. Method 400 proceeds to 412.

At 460, method 400 judges if an average of a plurality of warm cranking condition numeric values are to be assessed for the purpose of determining whether or not the engine should be automatically started if it is stopped and if automatic engine stopping and starting is to be permitted. In one example, method 400 may judge that an average of a plurality of warm cranking condition numeric values are to be assessed based on the engine and engine starting system configuration. For example, method 400 may judge that an average of a plurality of warm cranking condition numeric values are to be assessed based on a value of a variable that is stored in controller memory. The value of the variable stored in controller memory may be related to the engine and engine starting system configuration. If method 400 judges that the average of a plurality of warm cranking condition numeric values are to be assessed for the purpose of determining whether or not the engine should be automatically started if the engine is stopped and if automatic engine stopping and starting is to be permitted, then the answer is yes and method 400 proceeds to 462. Otherwise, the answer is no and method 400 proceeds to 470.

At 462, method 400 calculates an average or a plurality of warm cranking condition values that are determined at different times. The value of the warm cranking condition variable may be expressed as:

$$WCC = f(SOC, batt\_v, batt\_c, batt\_r, batt\_t)$$

where WCC is the warm cranking condition value at a particular time, SOC is battery state of charge, batt_v is battery voltage, batt_c is battery current, batt_r is battery resistance, and batt_t is battery temperature. Lower values of WCC may indicate battery cable degradation, high internal battery resistance, and other hardware degradation within the engine starting system. The average WCC value may be determined via the following equation:

$$\overline{WCC} = \frac{\left[ \begin{array}{c} WCC(t) + WCC(t-Ts) + WCC(t-2Ts) + \\ WCC(t-3Ts) + WCC(t-NTs) \end{array} \right]}{N}$$

where $\overline{WCC}$ is the average WCC value of a plurality of values, Ts is the sample time interval or time between samples of the WCC value, and N is the number of values in a data buffer of WCC values (the plurality of values of WCC). Method 400 proceeds to 464.

At 464, method 400 judges if the average of the plurality of WCC valves is less than a threshold value. If so, the answer is yes and method 400 proceeds to 466. Otherwise, the answer is no and method 400 proceeds to 468.

At 466, method 400 automatically starts the engine if the engine is already stopped. The engine may be automatically started so that engine out of operation (e.g., unable to automatically start the engine after the engine has been automatically stopped) conditions may be avoided. The engine may be automatically restarted before the WCC value reaches a low value where automatic engine starting may be less likely. Each time the average WCC value is less than the threshold, a value of a counter in memory may be incremented so that a total number of average WCC values that are less than the threshold may be determined. Method 400 proceeds to 480 of FIG. 9.

At 468, method 400 clears the automatic engine stopping and starting that is based on the average warm cranking condition value so that the engine may be automatically stopped and started. Thus, the engine may be allowed to automatically stop and start subject to other conditions. Method 400 proceeds to 480 of FIG. 9.

At 470, method 400 activates a timer and accumulates an amount of time that the sampled warm cranking condition value is less than a threshold value. For example, if the warm cranking condition value is less than a threshold value at time t1 and the warm cranking condition value is still less than the threshold value at time t2 without having exceeded the threshold value between time t1 and time t2, then the timer accumulates the amount of time between time t1 and time t2 (e.g., 30 seconds). Method 400 proceeds to 472.

At 472, method 400 judges if the amount of time the warm cranking condition was less than the threshold is greater than a second threshold amount of time. For example, if the second threshold amount of time is 15 seconds and the threshold amount of time accumulated at 470 is 30 seconds, then the answer is yes and method 400 proceeds to 474. Otherwise, the answer is no and method 400 proceeds to 476.

At 474, method 400 automatically starts the engine if the engine is already stopped. The engine may be automatically started so that engine out of operation (e.g., unable to automatically start the engine after the engine has been automatically stopped) conditions may be avoided. The engine may be automatically restarted before the WCC value reaches a low value where automatic engine starting may be less likely. Each time the average WCC value is less than the threshold, a value of a counter in memory may be incremented so that a total number of average WCC values that are less than the threshold may be determined. Method 400 proceeds to 480 of FIG. 9.

At 476, method 400 clears the automatic engine stopping and starting that is based on the average warm cranking condition value so that the engine may be automatically stopped and started. Thus, the engine may be allowed to automatically stop and start subject to other conditions. Method 400 proceeds to 480 of FIG. 9.

At 480, method 400 judges if the actual number of times that the average warm cranking condition value or the warm cranking condition value is less than a first threshold is greater than a third threshold number of times during the present vehicle drive cycle. For example, if the average warm cranking condition value is less than a threshold value (e.g., the first threshold value) three times during the present vehicle drive cycle and the third threshold value is one, then the answer is yes because three (the number of times the warm cranking condition value is less than the first threshold value) is greater than one (the third threshold value). If method 400 judges that the actual number of times that the average warm cranking condition value or the warm cranking condition value is less than a first threshold is greater than a third threshold number of times during the present vehicle drive cycle, then the answer is yes and method 400 proceeds to 482. Otherwise, method 400 proceeds to 414 of FIG. 4.

At 482, method 400 inhibits automatic engine stopping and starting for a predetermined amount of time (e.g., 20 minutes). The predetermined amount of time may give the battery time to charge and increase the warm cranking condition value. Method 400 may also set a diagnostic code in controller memory and provide an indication of engine stop/start system degradation via a human/machine interface. Method 400 proceeds to 484.

At 484, method 400 judges if the actual number of times that the average warm cranking condition value or the warm cranking condition value is less than a first threshold is greater than a fourth threshold number of times during the present vehicle drive cycle. For example, if the average warm cranking condition value is less than a threshold value (e.g., the first threshold value) five times during the present vehicle drive cycle and the third threshold value is two, then the answer is yes because five (the number of times the warm cranking condition value is less than the first threshold value) is greater than two (the fourth threshold value). If method 400 judges that the actual number of times that the average warm cranking condition value or the warm cranking condition value is less than a first threshold is greater than a third threshold number of times during the present vehicle drive cycle, then the answer is yes and method 400 proceeds to 486. Otherwise, method 400 proceeds to 414 of FIG. 4.

At 486, method 400 inhibits automatic engine stopping and starting for the remainder of the present vehicle drive cycle. The entire drive cycle may allow the battery time t0 charge and increase the warm cranking condition value. Method 400 may also set a diagnostic code in controller memory and provide an indication of engine stop/start system degradation via a human/machine interface. Method 400 proceeds to 488.

At 488, method 400 judges if the actual number of times that the average warm cranking condition value or the warm cranking condition value is less than a first threshold is greater than a fifth threshold number of times during the present vehicle drive cycle. For example, if the average warm cranking condition value is less than a threshold value (e.g., the first threshold value) four times during the present vehicle drive cycle and the fifth threshold value is three, then the answer is yes because four (the number of times the warm cranking condition value is less than the first threshold value) is greater than three (the fifth threshold value). If method 400 judges that the actual number of times that the average warm cranking condition value or the warm cranking condition value is less than a first threshold is greater than a fifth threshold number of times during the present vehicle drive cycle, then the answer is yes and method 400 proceeds to 490. Otherwise, method 400 proceeds to 414 of FIG. 4.

At 490, method 400 inhibits automatic engine stopping until the vehicle is serviced. By deactivating automatic engine stopping and starting until the vehicle is serviced, may allow the vehicle to operate during several additional drive cycles to allow the driver time t0 get the vehicle serviced before degradation of the starting system may be recognized. Method 400 may also set a diagnostic code in controller memory and provide an indication of engine stop/start system degradation via a human/machine interface. Method 400 proceeds to 414 of FIG. 4.

In this way, inhibiting of automatic engine stopping and starting by a human driver may be allowed and then cleared after a time t0 improve vehicle fuel economy. Further, automatic engine stopping and starting may be inhibited in response to a warm cranking condition parameter value that provides an indication of hardware degradation. By inhibiting automatic engine stopping and starting in response to warm cranking conditions, it may be possible to allow a driver to reach a destination where the vehicle may be serviced.

The method of FIGS. 4-9 provides for an engine operating method, comprising: automatically stopping and starting an engine via a controller; determining the presence of a request via a human/machine interface; inhibiting the automatic stopping and starting of the engine via the controller in response to a request made via a human/machine interface; determining the presence of a human driver initiated engine stop and engine temperature being less than a threshold temperature; and cancelling the request and allowing automatic stopping and starting of the engine via the controller in response to a human driver initiated engine stop and an engine temperature being less than a threshold temperature. The method further comprises automatically stopping and starting the engine via the controller in response to an absence of the request and vehicle operating conditions. The method includes where the vehicle operating conditions include driver demand torque being less than a threshold. The method further comprises cancelling the request and allowing automatic stopping and starting of the engine in response to a value of a timer exceeding a threshold. The method includes where the timer counts an amount of time between when a human driver stops the engine and when the human driver starts the engine after the engine was most recently stopped by the human driver. The method further comprises maintaining the request and inhibiting automatic stopping and starting of the engine in response to a value of a timer being less than the threshold. The method includes where automatically stopping the engine includes ceasing fuel flow to the engine and stopping rotation of the engine. The method includes where automatically starting the engine includes rotating the engine via an electric machine and supplying fuel to the engine.

The method of FIGS. 4-9 also provides for an engine operating method, comprising: automatically stopping and starting an engine via a controller; determining the presence of a request via a human/machine interface; inhibiting the automatic stopping and starting of the engine via the controller in response to a request made via a human/machine interface; determining the presence of a human driver initiated engine stop and a change in state of vehicle settings; cancelling the request and allowing automatic stopping and starting of the engine via the controller in response to a human driver initiated engine stop and the change in state of vehicle driver settings. The method further comprises automatically stopping and starting the engine via the controller in response to an absence of the request and vehicle operating conditions. The method further comprises cancelling the request and allowing automatic stopping and starting of the engine in response to a value of a timer exceeding a threshold. The method further comprises inhibiting the automatic stopping and starting of the engine via the controller in response to a warm cranking condition value being less than a threshold and an amount of time being greater than the threshold. The method includes where the amount of time is an amount of time the warm cranking condition is less than the threshold. The method includes where the change in state of vehicle settings includes a change in a position of a seat. The method includes where the change in state of vehicle settings includes a change in a position of a steering wheel.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. An engine operating method, comprising:
   automatically stopping and starting an engine via a controller;
   inhibiting the automatic stopping and starting of the engine via the controller in response to a request made via a human/machine interface; and
   cancelling the request and allowing automatic stopping and starting of the engine via the controller in response to a human driver initiated engine stop and an engine temperature being less than a threshold temperature.

2. The method of claim 1, further comprising automatically stopping and starting the engine via the controller in response to an absence of the request and vehicle operating conditions.

3. The method of claim 2, where the vehicle operating conditions include driver demand torque being less than a threshold.

4. The method of claim 1, further comprising cancelling the request and allowing automatic stopping and starting of the engine in response to a value of a timer exceeding a threshold.

5. The method of claim 4, where the timer counts an amount of time between when a human driver stops the engine and when the human driver starts the engine after the engine was most recently stopped by the human driver.

6. The method of claim 4, further comprising maintaining the request and inhibiting automatic stopping and starting of the engine in response to a value of the timer being less than the threshold.

7. The method of claim 1, where automatically stopping the engine includes ceasing fuel flow to the engine and stopping rotation of the engine.

8. The method of claim 1, where automatically starting the engine includes rotating the engine via an electric machine and supplying fuel to the engine.

9. An engine operating method, comprising:
   automatically stopping and starting an engine via a controller;
   inhibiting the automatic stopping and starting of the engine via the controller in response to a request made via a human/machine interface; and
   cancelling the request and allowing automatic stopping and starting of the engine via the controller in response to a human driver initiated engine stop and a change in state of vehicle driver settings.

10. The method of claim 9, further comprising automatically stopping and starting the engine via the controller in response to an absence of the request and vehicle operating conditions.

11. The method of claim 9, further comprising cancelling the request and allowing automatic stopping and starting of the engine in response to a value of a timer exceeding a threshold.

12. The method of claim 9, further comprising inhibiting the automatic stopping and starting of the engine via the controller in response to a warm cranking condition value being less than a threshold and an amount of time being greater than the threshold.

13. The method of claim 12, where the amount of time is an amount of time the warm cranking condition is less than the threshold.

14. The method of claim 9, where the change in state of vehicle settings includes a change in a position of a seat.

15. The method of claim 9, where the change in state of vehicle settings includes a change in a position of a steering wheel.

16. A system, comprising:
an engine;
a starter coupled to the engine; and
a controller including executable instructions stored in non-transitory memory to inhibit automatic stopping and starting of the engine in response to an average of a plurality of warm cranking condition values being less than a threshold value, and additional instructions to allow automatic stopping and starting of the engine in response to a human driver initiated engine stop and a change in state of vehicle driver settings.

17. The system of claim 16, further comprising additional instructions to allow automatic engine stopping and starting in response to the average of the plurality of warm cranking condition values being greater than the threshold value.

18. The system of claim 16, where the change in state of vehicle driver settings includes a change of a seat position.

19. The system of claim 16, further comprising additional instructions to allow automatic stopping and starting of the engine in response to the human driver initiated engine stop and engine temperature being less than a threshold temperature.

* * * * *